(12) United States Patent
Berryman et al.

(10) Patent No.: US 7,568,104 B2
(45) Date of Patent: Jul. 28, 2009

(54) METHOD AND APPARATUS FOR ADDING SIGNATURE INFORMATION TO ELECTRONIC DOCUMENTS

(75) Inventors: Christopher Brant Berryman, Lewisville, TX (US); Maieta Howze, Washington, DC (US); Thomas Y. Kwok, Washington Township, NJ (US); Mary Jo McMillin, East Moline, IL (US); Thao N. Nguyen, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/038,297

(22) Filed: Jan. 19, 2005

(65) Prior Publication Data
US 2006/0161780 A1 Jul. 20, 2006

(51) Int. Cl.
*H04L 9/00* (2006.01)
(52) U.S. Cl. .................. 713/176; 713/168; 713/150
(58) Field of Classification Search ............... 713/176, 713/168, 150
See application file for complete search history.

(56) References Cited

U.S. PATENT DOCUMENTS

| | | | |
|---|---|---|---|
| 5,018,196 | A | 5/1991 | Takaragi et al. |
| 6,307,955 | B1 | 10/2001 | Zank et al. |
| 2002/0091651 | A1 | 7/2002 | Petrogiannis et al. |
| 2002/0099938 | A1 | 7/2002 | Spitz |
| 2002/0116608 | A1 | 8/2002 | Wheeler et al. |
| 2003/0056100 | A1 | 3/2003 | Beatson |
| 2003/0074326 | A1 | 4/2003 | Byers |
| 2003/0177361 | A1 | 9/2003 | Wheeler et al. |
| 2004/0117627 | A1 | 6/2004 | Brewington |
| 2004/0148508 | A1 | 7/2004 | Alev et al. |

OTHER PUBLICATIONS

An optimal multilevel signature file for large databases Young Man Kim; Dik Lun Lee; Computing and Information, 1992. Proceedings. ICCI '92., Fourth International Conference on May 28-30, 1992 pp. 373-376.*

Document image retrieval using signatures as queries Srihari, S.N.; Shetty, S.; Siyuan Chen; Srinivasan, H.; Chen Huang; Agam, G.; Frieder, O.; Document Image Analysis for Libraries, 2006. DIAL '06. Second International Conference on Apr. 27-28, 2006 pp. 6 pp. -203.*

A robust soft hash algorithm for digital image signature Lefebvre, F.; Czyz, J.; Macq, B.; Image Processing, 2003. ICIP 2003. Proceedings. 2003 International Conference on vol. 2, Sep. 14-17, 2003 pp. II-495-8 vol. 3.*

Fischmeister, et al., "Hermes—A Lean M-Commerce Software Platform Utilizing Electronic Signatures", Proceedings of the 35th Hawaii International Conference on System Sciences, 2002.

(Continued)

*Primary Examiner*—David Y Jung

(57) ABSTRACT

In one embodiment, the present invention is a method and apparatus for adding signature information to electronic documents. One embodiment of the inventive method involves adding the signature information into a signature data field template corresponding to the electronic document, converting the signature data field template, including the added signature information, to an image file, and superimposing the image file over the electronic document to produce a signed electronic document. The inventive method substantially eliminates the potential for human error and security breaches in the signing of electronic documents.

1 Claim, 5 Drawing Sheets

OTHER PUBLICATIONS

Kang, C., "New Digital Multisignature Scheme in Electronic Contract Systems," In: Proc. of 1995 IEEE International Symposium on Information Theory, pp. 486. IEEE,1995.

Pong, M. "EC-SignGate: Electronic Contract Signing Gateway," 25th Annual International Computer Software and Applications Conference (COMPSAC'01), 245-248, Oct. 8-12, 2001 Chicago, Illinois.

PCT Search Report and Written Opinion for PCT/US06/01766; copy consists of 8 unnumbered pages.

* cited by examiner

METHOD AND APPARATUS FOR ADDING SIGNATURE INFORMATION TO ELECTRONIC DOCUMENTS

BACKGROUND

The present invention relates generally to electronic document management, and relates more particularly to the signing of electronic documents. Specifically, the present invention provides a method and apparatus for adding signature information to electronic documents in a secure environment.

Adding signature information to an electronic document (e.g., an electronic contract) can be an extremely tedious undertaking due to the numerous manual tasks involved. For example, a typical procedure for signing an electronic document may include removing security settings from the electronic document, determining the type or format of the electronic document, determining the orientation of the electronic document, locating signature pages and the positions of signature fields within the electronic document, determining the number of signatures required and retrieving the necessary signature information, adding this signature information to the electronic document, watermarking the signed electronic document to distinguish it from other copies of the same electronic document, restoring security settings to the signed electronic document and converting the signed electronic document to one or more other formats for storage and/or other execution processes (e.g., fulfillment).

The manual nature of the above process renders it both tedious and inefficient, as user error may result in a processing error or even a security breach. For example, electronic documents may exist in a variety of formats including text and image formats, and may even be received from facsimile machines and stored as scanned copies. These different formats may have signature fields located on different pages and in different portions of the electronic document. Additionally, if the electronic document and the signature information exist in two different formats, addition of the signature information may be even more difficult. The electronic documents may also include a plurality of associated documents, including master agreements, supplements, amendments, addenda and other documents that may also require signatures. Moreover, an electronic document may require signatures from more than one party.

Thus, there is a need in the art for a method and apparatus for adding signature information to electronic documents.

SUMMARY OF THE INVENTION

In one embodiment, the present invention is a method and apparatus for adding signature information to electronic documents. One embodiment of the inventive method involves adding the signature information into a signature data field template corresponding to the electronic document, converting the signature data field template, including the added signature information, to an image file, and superimposing the image file over the electronic document to produce a signed electronic document. The inventive method substantially eliminates the potential for human error and security breaches in the signing of electronic documents.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for adding signature information to electronic documents, including electronic business documents such as electronic contracts. The method and apparatus of the present invention provide an efficient, automated system for adding signatures to electronic documents in a secure environment. The system substantially eliminates the potential for human error and security breaches in the signing of electronic documents by providing a means for signature information to be added to an electronic document regardless of the electronic document's format, the locations of the signature fields, or the electronic document's security settings.

Figure 1:
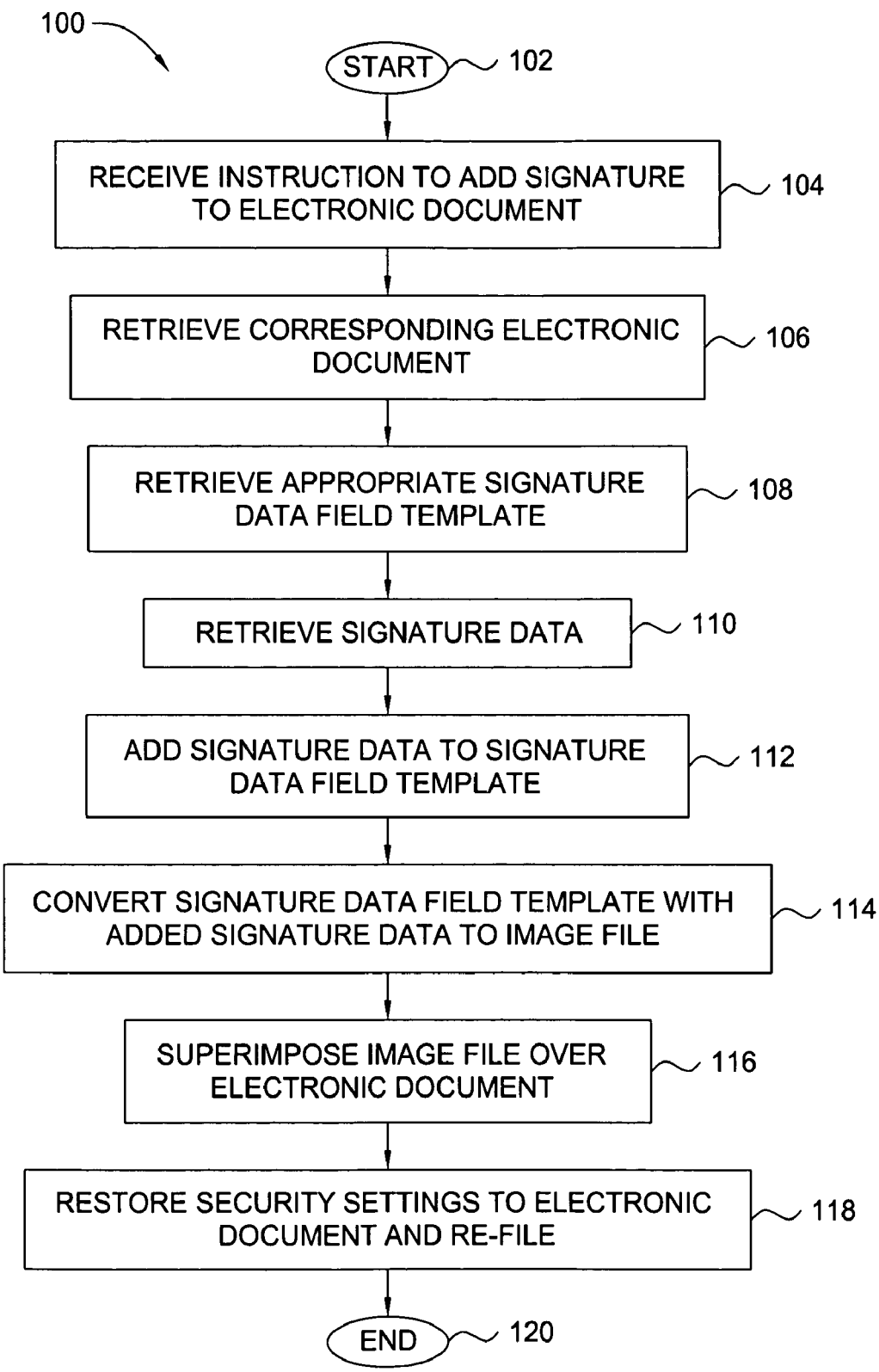
FIG. 1 is a flow diagram illustrating one embodiment of a method for adding signature information to an electronic document.

FIG. 1 is a flow diagram illustrating one embodiment of a method 100 for adding signature information to an electronic document. The method 100 is initialized at step 102 and proceeds to step 104, where the method 100 receives instructions to add a signature to an electronic document. In one embodiment, this instruction is received directly from a user, e.g., via a graphical user interface such as a button (e.g., "I accept" or "Sign now"), via a keystroke or via an independent electronic communication such as an e-mail. This action by the user will also generate a signature data file for later use by the method 100, as described in greater detail below (i.e., in connection with step 110).

In step 106, the method 100 retrieves the corresponding electronic document. In one embodiment, the retrieved electronic document is a dynamically generated electronic document. In another embodiment, the electronic document is retrieved from a document database such as a local file system or a remote database. In one embodiment, retrieval of the electronic document involves disabling one or more security settings associated with the electronic document, so that the electronic document may be modified with the addition of the signature data. In addition, the method 100 parses the properties of the electronic document, e.g., as stored in a document profile, barcode or meta-data. In one embodiment, the parsed properties include at least one of the electronic document type, the electronic document orientation, the page numbers of signature data fields contained in the electronic document and the positions of the signature data fields on these pages. The electronic document may be in any format, including text and image, among others.

In step 108, the method 100 retrieves an appropriate signature data field template. In one embodiment the signature data field template is a text template corresponding to a particular electronic document type and containing hidden empty signature data fields in locations that correspond to the signature fields of the corresponding electronic document. It is assumed that certain types of electronic documents will almost always have signature fields on the same pages and in the same locations.

Thus, in one embodiment, the selection of the appropriate signature data field template is guided at least in part by the parsed properties of the electronic document, including the electronic document type and the page numbers and positions of the signature data fields. In another embodiment, where the electronic document properties are not automatically available via a profile or other mechanism, the method 100 retrieves the appropriate signature data field template in accordance with manual prompts from a user (e.g., selecting the electronic document type and the page numbers of the signature data fields). In one embodiment, the signature data field template is dynamically generated by a discrete template generation module and retrieved directly from the template generation module. In another embodiment, the signature data field template is retrieved from a template database such as a local file system or a remote database that stores a plurality of signature data field templates for known document types.

In step 110, the method 100 retrieves the signature data to be added to the electronic document. In one embodiment, this signature data is embodied in a signature information file that comprises at least one of the name of the signer, the company that the signer represents, the date of the signature, the timestamp of the signature and digital ink (e.g., as collected from an electronic, on-line or Internet process). The signature data can be in any one of a variety of formats, including, but not limited to, a printed signature, a handwritten signature, a finger print and an eye pigment. Moreover, the signature data may include the signature of a single party or of a plurality of parties. In one embodiment, the signature data file must be decoded before it can be used in further steps of the method 100, e.g., using an encryption engine.

Once the electronic document, the corresponding signature data field template and the signature data have been retrieved, the method 100 proceeds to step 112 and adds the signature data to the signature data field template. In one embodiment, the signature data is added as text into the signature data field template, which is also in text format. In one embodiment, addition of the signature data to the signature data field template also includes adjusting the text position of the signature data in the signature data field template, e.g., in accordance with the properties of the electronic document to which the signature data is to be ultimately added (e.g., as determined from the electronic document profile or meta-data) or in accordance with other user input (e.g., from a graphical user interface).

In step 114, the method 100 converts the signature data field template, including the added signature data, to an image file. The method 100 then proceeds to step 116 and superimposes this image file over the electronic document to produce a signed electronic document (e.g., where the signature data is added in a manner similar to a watermark).

In step 118, the method 100 restores any security settings associated with the electronic document that were disabled when the electronic document was retrieved, e.g., to ensure that the added signature information cannot be altered. The method 100 then re-files the newly signed electronic document, e.g., in the document database. The method 100 then terminates in step 120.

Thus, the method 100 enables signature data to be added to substantially any electronic document, without the need to determine the format (e.g., text, image, etc.) of the electronic document, to manually format the signature information or locate signature fields in the electronic document—thus, the method 100 is substantially format independent. In addition, the method 100 provides security to signed electronic documents. By adding the signature information in image format and restoring security settings to the signed electronic document, future modification of the electronic document or the signature can be substantially prevented. The method 100 may be implemented to add signature data to electronic documents within a Web application, or alternatively to electronic documents within a stand-alone electronic document signing system (e.g., with secure signature information from the Web).

Moreover, the method 100 may be implemented to cover any signature fields or test blocks in an electronic document that are duplicated or that simply need to be removed. In addition, those skilled in the art will appreciate that the individual steps of the method 100 may be executed entirely by a single device or module, or may alternatively be distributed among a plurality of discrete modules.

Figure 2:
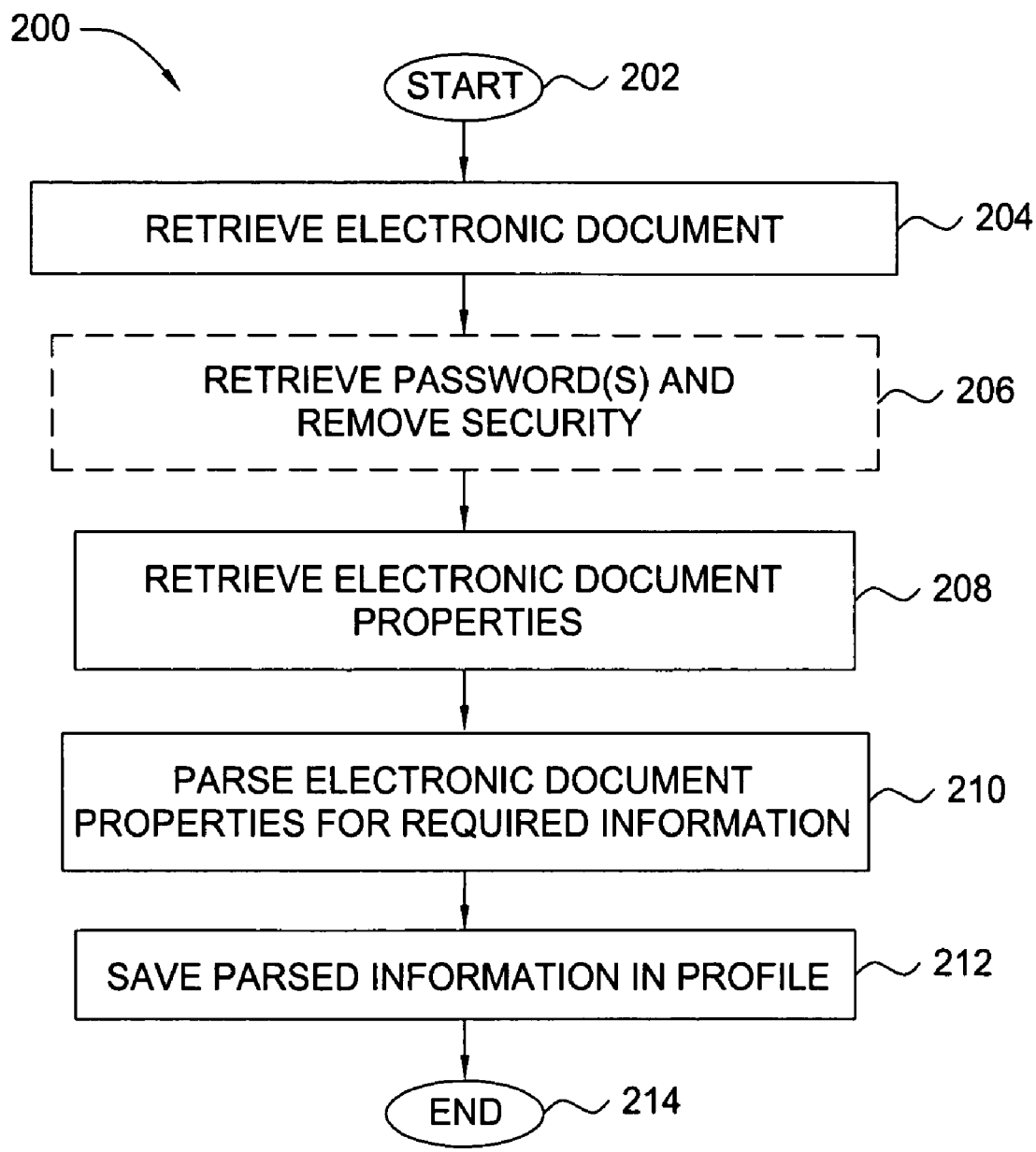
FIG. 2 is a flow diagram illustrating one embodiment of a method for generating a profile for an electronic document.

FIG. 2 is a flow diagram illustrating one embodiment of a method 200 for generating a profile for an electronic document, e.g., for use in accordance with step 106 of the method 100. The method 200 is initialized at step 202 and proceeds to step 204, where the method 200 retrieves an electronic document for which the profile is to be created. The electronic document may be retrieved from a database (e.g., a local file system or remote database), or the electronic document may be dynamically generated.

In optional step 206 (illustrated in phantom), the method 200 retrieves any passwords that protect the electronic document and removes any security settings protecting the r electronic document. In some embodiments, there may be no security settings protecting the electronic document.

The method 200 then proceeds to step 208 and retrieves the properties of the electronic document. In one embodiment, these properties are retrieved from at least one of an existing document profile, meta-data, or manual user input (e.g., via a graphical user interface).

In step 210, the method 200 parses the document properties for information that is required to build a document profile for use by the method 100. In one embodiment, the required information includes at least one of the document type, the document orientation, the number of signatures required by the document, the type of each required signature, the number of signature fields for each required signature, the page number of each signature data field and the position of each signature data field.

The method 200 then proceeds to step 212 and saves the parsed information, e.g., as a document profile, meta-data or a barcode for use by the method 100. The method 200 terminates in step 214.

Figure 3:
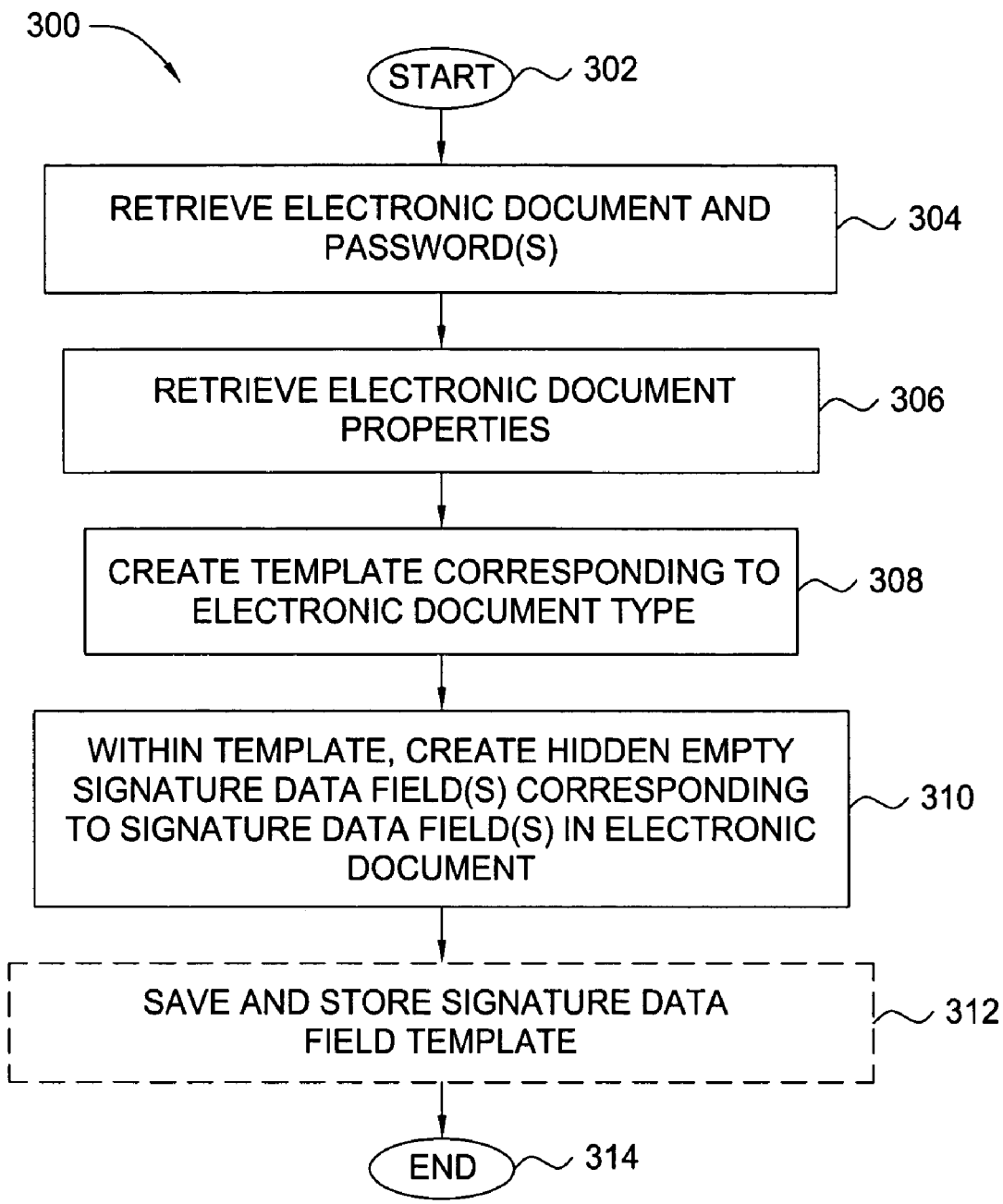
FIG. 3 is a flow diagram illustrating one embodiment of a method for generating a signature data field template.

FIG. 3 is a flow diagram illustrating one embodiment of a method 300 for generating a signature data field template, e.g., for use in accordance with steps 108 and 112-114 of the method 100. The method 300 is initialized at step 302 and proceeds to step 304, where the method 300 retrieves an electronic document for which a signature data field template is to be created, as well as any passwords protecting the electronic document.

In step 306, the method 300 retrieves the properties of the electronic document, e.g., from a document profile such as that generated by the method 200. The method 300 then proceeds to step 308 and creates a template corresponding to the electronic document type as defined in the retrieved document properties.

In step 310, the method 300 creates, within the template, a corresponding hidden empty signature data field for every signature data field that exists within the electronic document, thereby producing a signature data field template that corresponds to the electronic document.

In optional step 312 (illustrated in phantom), the method 300 saves the signature data field template, e.g., in a local file system or remote database. Alternatively, the signature data field template may be dynamically created for immediate use by the method 100. The method 300 then terminates in step 314.

Figure 4:
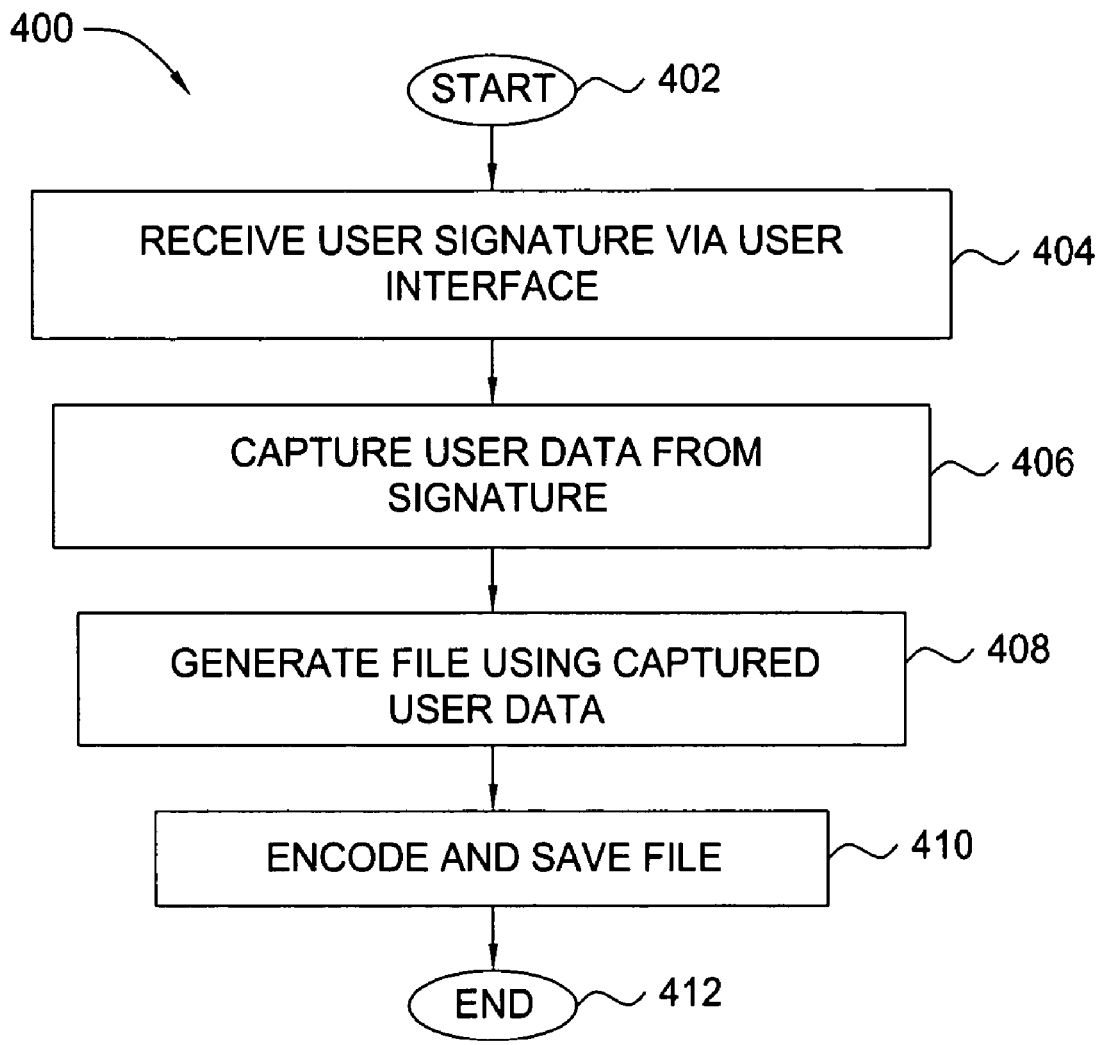
FIG. 4 is a flow diagram illustrating one embodiment of a method for generating signature data files.

FIG. 4 is a flow diagram illustrating one embodiment of a method 400 for generating signature data files, e.g., for use in accordance with step 110 of the method 100. The method 400 is initialized at step 402 and proceeds to step 404, where the method 400 receives the user signature via a user interface, such as a signature or acceptance button, a touch sensor pad, a closeup camera or a handwriting pad.

In step 406, the method 400 captures user (signer) data from the signature. For example, where the user's signature has been received via a signature or acceptance button, the captured user data may include the user's name, the system uniform resource locator (URL) and/or the timestamp of the signature; where the user's signature has been received via a touch sensor pad, the captured user data may be the user's finger print; where the user's signature has been received via a closeup camera, the captured user data may be the user's eye pigment; and where the user's signature has been received via a handwriting pad, the captured user data may be the user's signature strokes and/or the timestamp of the signature.

Once the appropriate user data has been captured, the method 400 proceeds to step 408 and generates a signature data file using the captured data. The method 400 then encodes and saves this signature data file (e.g., in a local file system or remote database) in step 410. In step 412, the method 400 terminates.

Figure 5:
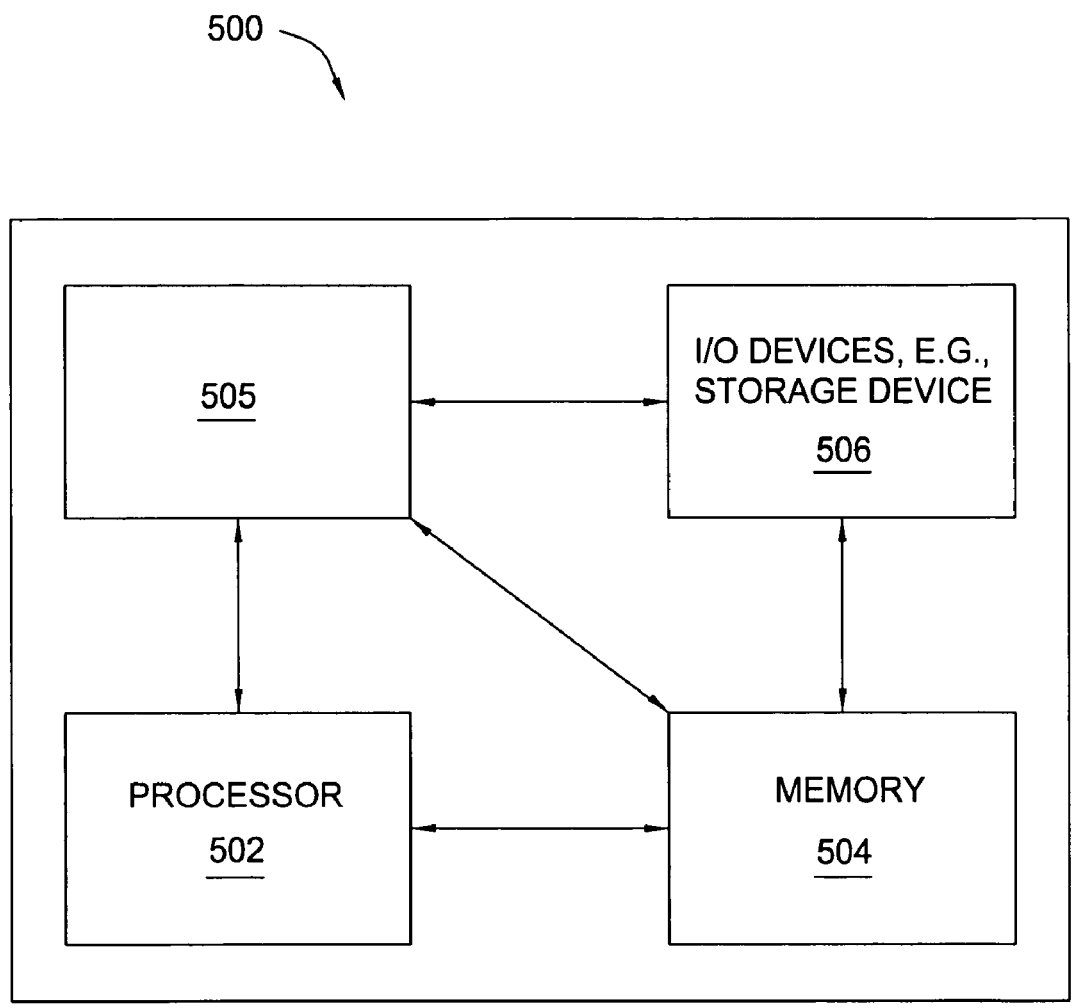
FIG. 5 is a high level block diagram of the present invention implemented using a general purpose computing device.

FIG. 5 is a high level block diagram of the present electronic document signing system that is implemented using a general purpose computing device 500. In one embodiment, a general purpose computing device 500 comprises a processor 502, a memory 504, an electronic document signer or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the electronic document signer 505 can be implemented as a physical device or subsystem that is coupled to a processor through a communication channel.

Alternatively, the electronic document signer 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the electronic document signer 505 for adding signature to electronic documents described herein with reference to the preceding Figures can be stored on a computer readable medium or carrier (e.g., RAM, magnetic or optical drive or diskette, and the like).

Thus, the present invention represents a significant advancement in the field of electronic document management. A method and apparatus for adding signature information to electronic documents, including electronic business documents such as electronic contracts, is provided. The method and apparatus of the present invention provide an efficient, automated system for adding signatures to electronic documents in a secure environment. The system substantially eliminates the potential for human error and security breaches in the signing of electronic documents by providing a means for signature information to be added to an electronic document regardless of the electronic document's format, the locations of the signature fields, or the electronic document's security settings.

While foregoing is directed to the preferred embodiment of the present invention, other and further embodiments of the invention may be devised without departing from the basic scope thereof, and the scope thereof is determined by the claims that follow.

The invention claimed is:

1. A method for adding signature information to an electronic document, the method comprising:
dynamically generating a signature data field template, wherein said signature data field template comprises at least one empty signature data field positioned in a location that corresponds to a location of a signature data field in said electronic document, wherein said signature data field template is generated by:
retrieving said electronic document from a document database;
creating a template in accordance with at least one property of said electronic document, wherein said at least one property of said electronic document comprises at least one of: an electronic document type, an electronic document orientation, a number of signatures required on said electronic document, a type of each required signature, a number of signature fields for each required signature, a page number of each signature field contained in said electronic document, or a position of each signature field on a respective page of said electronic document; and
creating within said template said at least one empty signature data field;
adding said signature information into said signature data field template;
converting said signature data field template, including said added signature information, to an image file;
removing at least one security setting from said electronic document;
superimposing said image file over said electronic document to produce a signed electronic document;
restoring said at least one security setting to said signed electronic document; and
storing said signed electronic document in said document database.

* * * * *